United States Patent
Karlsson et al.

(10) Patent No.: US 7,362,766 B2
(45) Date of Patent: Apr. 22, 2008

(54) SYSTEM AND METHOD FOR DYNAMICALLY CONTROLLING WEIGHTS ASSIGNED TO CONSUMERS COMPETING FOR A SHARED RESOURCE

(75) Inventors: Magnus Karlsson, Mountain View, CA (US); Christos Karamanolis, Los Gatos, CA (US); Xiaoyun Zhu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 364 days.

(21) Appl. No.: 11/166,326

(22) Filed: Jun. 24, 2005

(65) Prior Publication Data

US 2006/0294044 A1    Dec. 28, 2006

(51) Int. Cl.
*H04L 12/00* (2006.01)
(52) U.S. Cl. .................. 370/395.4; 370/229
(58) Field of Classification Search ............. 707/1, 707/2; 370/229, 395.4
See application file for complete search history.

(56) References Cited

U.S. PATENT DOCUMENTS

| | | | | |
|---|---|---|---|---|
| 2004/0230675 A1* | 11/2004 | Freimuth et al. | ........... | 709/223 |
| 2006/0120380 A1* | 6/2006 | Lu et al. | ................. | 370/395.4 |
| 2006/0187934 A1* | 8/2006 | Lu | ........................ | 370/395.4 |

OTHER PUBLICATIONS

Carney, D. et al., "Monitoring Streams—A New Class of Data Management Applications", in Brown Computer Science Technical Report, TR-CS-02-04, pp. 0-13.
Ciuffoletti, A. et al., "Architecture of Monitoring Elements for the Network Element Modeling in a Grid Infrastructure", presented in Computing in High Energy Physics, La Jolla, California Mar. 24-28, 2003, pp. 1-4.
Configuring Metric Collection for z/OS Systems', Tivoli Software, [online] [Retrieved on Sep. 14, 2005] Retrieved from: http://publib.boulder.ibm.com/tividd/tdITMWI/SC23-4705-02/en_US/HTML/wasugmst39.htm, pp. 1-3.

* cited by examiner

*Primary Examiner*—Cheryl Lewis

(57) ABSTRACT

According to one embodiment, a method comprises scheduling, by a weighted proportional-share scheduler, access of competing flows to a computing service in accordance with respective weights assigned to the competing flows. The method further comprises autonomously determining, by a controller, based at least in part on received performance measurement for the flows, values of the respective weights assigned to the competing flows for achieving respective performance goals desired for the competing flows. When determined by the controller that the values of the respective weights assigned to the competing flows should be changed for achieving the performance goals, the controller communicates the changed values of the respective weights to the weighted proportional-share scheduler.

17 Claims, 2 Drawing Sheets

SYSTEM AND METHOD FOR DYNAMICALLY CONTROLLING WEIGHTS ASSIGNED TO CONSUMERS COMPETING FOR A SHARED RESOURCE

CROSS-REFERENCE TO RELATED APPLICATIONS

This application is related to co-pending and commonly assigned U.S. patent application Ser. No. 11,149,991 titled "SYSTEM AND METHOD FOR DETERMINING CORRECT SIGN OF RESPONSE OF AN ADAPTIVE CONTROLLER", and Ser. No. 11,151,159 titled "A WEIGHTED PROPORTIONAL-SHARE SCHEDULER THAT MAINTAINS FAIRNESS IN ALLOCATING SHARES OF A RESOURCE TO COMPETING CONSUMERS WHEN WEIGHTS ASSIGNED TO THE CONSUMERS CHANGE", the disclosures of which are hereby incorporated herein by reference.

FIELD OF THE INVENTION

The following description relates generally to resource allocation, and more specifically to a system and method for dynamically controlling weights assigned to consumers competing for a shared resource, wherein a proportional-share scheduler schedules access to the shared resource based on the assigned weights.

DESCRIPTION OF RELATED ART

Various systems exist in which allocation of resources is managed by a scheduling system. For instance, shares of resources may be allocated, by a scheduler, to various competing consumers (e.g., computer workloads) in attempt to satisfy performance goals of the consumers. That is, the consumers may be considered as "competing" because they all desire use of the resource, and the scheduler may allocate shares of utilization of such resource among the consumers. The scheduler may use some algorithm for enforcing an appropriate share of the resource to allocate to each consumer at any given time, such as a weighted proportional-share algorithm described further below. The performance goals of consumers, such as response time bounds and minimum throughput requirements, are typically expressed in the form of Service Level Agreements (SLAs). The performance level achieved by consumers may be controlled by varying the shares of resources available to each consumer. Proportional-share schedulers are known in the art for controlling the shares of resources that are allocated to consumers. Proportional-share schedulers are most commonly implemented using variants of Weighted Fair Queuing (WFQ). The use of WFQ schedulers for meeting SLAs is based on the premise that the performance of a workload varies in a predictable way with the amount of resources available to execute it.

WFQ schedulers have been used to ensure sharing of a computing resource or "service" (e.g., network link, CPU, file server, etc.) in proportion to an explicitly specified "weight" for each of the "flows" (or "consumers") that compete for the resource (a "weight" is a quantification of the "share" of a consumer). In this regard, a "flow" refers to a sequence of tasks (network packets, instructions, I/O requests, etc.) that are using the shared resource(s). Because each flow desires use of the shared resource(s), a flow may be considered as a "resource consumer." Weights can be assigned to each consumer (e.g., each flow) to define respective priorities for allocating resource access among various competing consumers. Existing WFQ schedulers are "fair" in the sense that active flows share the available resource capacity proportionally to their weights, within some tolerance that is bounded by a constant over any time interval. The weights thus allow for performance differentiation. That is, by setting the weights, the performance of the different flows can be differentiated in accordance, for example, with their respective SLAs.

Weight adjustment may be desired from time-to-time in certain computing systems, such as in computing systems where specified performance goals have to be met for each flow and/or where effective utilization of shared resource(s) is desired. In the general case, the performance of a flow varies with the amount of resources available to execute it. Flow weights may thus be adjusted dynamically to adapt to system and workload dynamics, so that performance goals are met and the service resources are effectively utilized. Traditionally, weights assigned to flows have not been changed dynamically based on performance of the flows. Rather, the weights have traditionally been statically assigned to the flows and not varied during system runtime. As a result, workloads either missed their goals during certain periods of time, or system resources were underutilized during certain periods of time. Closed-loop systems are known in many fields/applications, wherein a controller monitors the behavior of a system and adjusts dynamically certain parameters of the system based on the feedback and aiming at meeting some goal for the system's behavior. For example, self-tuning regulators (STRs) are well-known devices that are commonly used in closed-loop systems. However, a closed-loop system has traditionally not been employed for dynamically adjusting, based on monitored performance of flows accessing a shared computing service, flow weights used by a proportional-weighted scheduler. As discussed in co-pending and commonly assigned U.S. patent application Ser. No. 11/151,159 titled ""A WEIGHTED PROPORTIONAL-SHARE SCHEDULER THAT MAINTAINS FAIRNESS IN ALLOCATING SHARES OF A RESOURCE TO COMPETING CONSUMERS WHEN WEIGHTS ASSIGNED TO THE CONSUMERS CHANGE", the disclosure of which is hereby incorporated herein by reference, such a closed-loop system has not traditionally been used for dynamically adjusting flow weights because traditional proportional-share scheduling algorithms could not maintain fairness with dynamically changing weights.

W. Jin, J. Chase, and J. Kaur propose in "Interposed proportional sharing for a storage service utility, in *International Conference on Measurement and Modelling of Computer Systems (SIGMETRICS)*, pages 37-48, New York, N.Y., USA, June 2004 that performance of different flows can be differentiated by using different weights assigned to the flows. However, in this proposed solution, a human user is required to analyze the system (e.g., by running some experiments or running the actual system to evaluate the performance of the flows), and on the basis of that analysis the human can change the weights of the scheduler. Thus, this does not provide an automated way of dynamically adjusting the flow weights based on monitored performance. Additionally, this technique proposed by W. Jin et al. requires a priori knowledge of the system (i.e., the shared resource).

It is desirable for shared computing services to control resource usage to meet contractual performance goals for hosted customers. To do so, it becomes desirable for the computing service to ensure performance isolation among the workloads of different customers and enforce prioritization when the service is overloaded. Traditional solutions for providing performance isolation and enforcing prioritization are domain-specific and require modifications to the computing service.

Intercepting and controlling the workloads (or "flows") that access a computing service has been previously proposed in the context of 3-tiered Web sites and storage systems, as examples. These previously proposed approaches attempt to enforce some performance goals under certain assumptions about the workload behavior and the system state. Most traditional approaches cannot ensure performance differentiation when the workloads or system deviate from those specifications. The Triage approach (M. Karlsson, C. Karamanolis, and X. Zhu, "Triage: Performance Isolation and Differentiation for Storage Systems", *International Workshop on Quality of Service (IWQoS)*, pages 67-74, Montreal, Canada, June 2004) provides differentiated throughput allocation, but only for fixed latency goals. Moreover, no existing approaches can automatically detect and deal with workload dependencies on internal resources. For example, the Triage approach penalizes all workloads when a performance degradation occurs due to an internal conflict between just two workloads. Last but not least, most existing approaches are designed assuming some knowledge of the target computing service. There have been a number of intrusive control theoretic approaches that provide performance differentiation by modifying the target service and/or using application-specific hooks. The systems targeted include Web servers, e-mail servers, databases, file systems, and middleware platforms.

While closed-loop systems have been employed for controlling performance of systems in various ways, none of these systems have dynamically controlled the flow weights used by a proportional-share scheduler. Accordingly, it is desirable to provide a system and method for dynamically controlling the flow weights used by a proportional-share scheduler based on observed performance of the flows. Further, a desire exists for a system and method that can autonomously control the flow weights responsive to observed performance, rather than requiring human interaction for controlling the flow weights.

DETAILED DESCRIPTION

Figure 1:
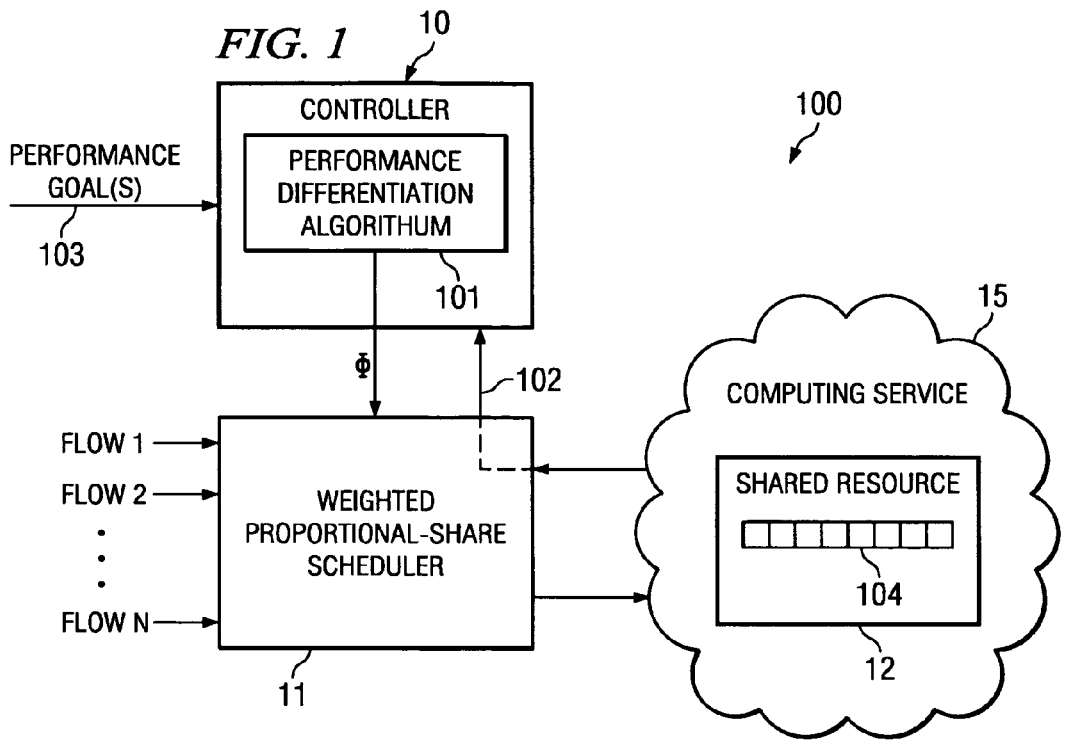
FIG. 1 shows an exemplary system in which embodiments of the present invention may be employed.

Embodiments of the present invention provide a system and method for dynamically controlling weights assigned to consumers competing for a shared resource. As discussed further below, the assigned weights are used by a proportional-share scheduler for allocating the shared resource among the competing consumers. A controller is provided that is operable to monitor performance of the consumers (e.g., "flows" or "workloads"), such as throughput and latency, and based on the observed performance the controller is operable to autonomously adjust the weights assigned to the competing consumers to achieve a predefined performance goal of each consumer. While latency and throughput are examples of metrics that may be used in defining performance goals in certain embodiments, other metrics may be used in other embodiments in addition to or instead of latency and throughput. Any metric that can be measured in the system and communicated to the controller may be used, including without limitation such metrics as resource utilization, queue lengths, delays in the system, etc. In one embodiment, the controller is a self-tuning regulator (STR) that comprises a model estimator and a control law, wherein an optimal control law is implemented for dynamically controlling weights assigned to competing consumers based on a performance model derived by the model estimator (based on performance measurements received for the competing consumers).

According to certain embodiments, a system-generic (as opposed to system dependent), non-intrusive approach is provided that uses a fair scheduler to intercept incoming requests and enforce proportional sharing of computing service resources among workloads. The relation between workload shares and obtained performance varies over time depending on system dynamics. In certain embodiments, an adaptive optimal MIMO (multiple-input-multiple-output) controller is provided that dynamically sets the workload weights based on the observed performance. The controller can achieve effective performance differentiation, even when the system state or the performance goals change significantly.

Thus, exemplary embodiments are discussed further below which employ a closed-loop system in which a controller monitors performance of a system and, based on the observed performance and a desired performance goal, autonomously adjusts the weights assigned to competing consumers, wherein the weights are used by a proportional-share scheduler for scheduling access to the shared resource. Accordingly, user interaction is not required for adjusting the weights assigned to the competing consumers, in certain embodiments discussed further below. Also, exemplary embodiments discussed below provide a technique that can be used for controlling the weights assigned to competing consumers without requiring a priori knowledge of the system (i.e., the shared resource and/or interrelationships between the competing consumers).

As further discussed below, certain embodiments of the present invention can be used for multiple types of resources or multiple parameters. Further, in certain embodiments multiple metrics can be used by the controller in its performance evaluation. For instance, a performance goal of X amount of CPU utilization and Y amount of network utilization may be specified for the consumers. The controller may monitor that plurality of metrics and dynamically adjust weights assigned to the competing consumers in attempt to achieve their respective performance goals. For example, a defined performance goal for a workload may be some latency or throughput goal, and in certain embodiments, several resources may be controlled in order to achieve the defined performance goal.

In certain embodiments, the controller can autonomously detect interrelationships or correlations between the consumers and adjust its determination of the proper weighting to be assigned to the consumers based on their interrelationships/correlations. For instance, suppose there are three workloads in a system having two computers/CPUs where two of the workloads are executing on one of the computers while the third workload is alone on the other computer. If a first one of the workload sharing the first computer is not meeting its performance goal, it is important to know that it will only help to give the second workload sharing this computer less share of the computer. Adjusting the third workload executing on the separate computer is completely useless in attempting to impact the performance of the first workload in this example.

Thus, with embodiments of the present invention, the controller can deal with the fact that over time the different consumers may compete for different resources in the system. For example, initially two workloads may be memory bound so they contend for the CPU and access to memory pages. However, later those workloads may contend for access to the hard disk. So, the controller can autonomously detect which workloads are competing for the same resource somewhere in the system without actually knowing what that resource is or without any prior knowledge of the workloads. And, the controller can take that detection into account for how it sets the weights in the scheduler. Various other features of embodiments of the present invention are discussed further below.

FIG. 1 shows an exemplary system 100 in which embodiments of the present invention may be employed. More specifically, exemplary system 100 is a closed-loop system comprising a shared resource 12 of computing service 15, proportional-share scheduler 11, and controller 10. Proportional-share scheduler 11 allocates shares of resource 12 to requesting flows 1-N in proportion to the respective weight "φ" assigned to each flow. For instance, in certain embodiments, proportional-share scheduler 11 utilizes a WFQ algorithm for allocating shares of resource 12 to requesting flows 1-N. Of course, embodiments of the present invention are not limited in application to WFQ schedulers, but may likewise be applied to any other weighted proportional-share algorithm now known or later developed.

Traditional WFQ scheduling algorithms assume that flow weights are fixed (or "static") over time. Such traditional WFQ scheduling algorithms cannot ensure fairness when weights are adjusted dynamically (e.g., by controller 10). Embodiments of co-pending and commonly assigned U.S. patent application Ser. No. 11/151,159, titled "A WEIGHTED PROPORTIONAL-SHARE SCHEDULER THAT MAINTAINS FAIRNESS IN ALLOCATING SHARES OF A RESOURCE TO COMPETING CONSUMERS WHEN WEIGHTS ASSIGNED TO THE CONSUMERS CHANGE," the disclosure of which is hereby incorporated herein by reference, provide an exemplary weighted scheduler that is dynamically adaptable to changing weights, which may be employed as scheduler 11 in system 100. Embodiments of the present invention are not intended to be limited with regard to how the scheduler 11 is implemented to handle changing weights received thereby, and are directed to techniques for controller 10 to autonomously determine/change the weights φ to be applied for a proportional-share scheduler 11. For instance, any variant of a WFQ scheduler that ensures fairness even when the weights change dynamically may be used, and thus embodiments of the present invention are not limited in application to use with the exemplary schedulers disclosed in the above-referenced U.S. patent application Ser. No. 11/151,159.

Controller 10 monitors performance 102 of the requesting flows (e.g., to determine whether their respective performances are satisfying their respective performance goals 103, as may be defined by an SLA), and dynamically changes the respective flow weights φ assigned to the flows in order to achieve the desired performance goals 103 predefined for each flow. More particularly, controller 10 employs performance differentiation algorithm 101 that is operable to, based at least in part on performance measurements 102, determine the proper weight assignments φ for the competing flows 1-N for achieving the desired performance goals 103 predefined for each of the flows. For instance, in one exemplary embodiment, performance differentiation algorithm 101 implements equation 14 to autonomously determine the proper weight assignments φ based on the received performance measurement 102 and performance goals 103. Thus, controller 10 is implemented to autonomously adjust the weights φ based on the received performance measurements 102 in attempt to achieve the desired performance goals 103 for flows 1-N.

Flows 1-N may each be a sequence of tasks (network packets, instructions, I/O requests, etc.) that are using the shared resource 12. Flows 1-N are thus examples of competing "resource consumers" because they consume some share of resource 12 for performing their respective tasks. Blocks 104 within resource 12 represent the total number of requests/tasks inside the system at a given time. The number of these taken by a specific flow is dependent on the flow's assigned weight φ.

Thus, system 100 provides an exemplary closed-loop system comprising a weighted proportional-share scheduler 11 that is used for resource allocation to requesting resource consumers (flows 1-N), wherein the weights φ assigned to the resource consumers may be dynamically adjusted by controller 10 in attempt, for example, to achieve performance goals 103 of the resource consumers and/or effectively utilize shares of shared resource 12.

In system 100, shared resource 12 may be part of a computing service 15 that may comprise an ensemble of such resources that are accessed by a number of clients. The computing service 15 can be any computing system that given a request returns a reply with some data. Examples of such computing service 15 include without limitation file servers, 3-tier systems, Web servers, and databases. Client requests are grouped into service classes called flows (or "workloads"). A performance goal 103 is associated with a flow, and such performance goal 103 is received by adaptive controller 10. According to embodiments of the present invention, adaptive controller 10 (via performance differentiation algorithm 101) dynamically adjusts the weights φ in order to control the rates at which the competing flows consume the shared resources 12 in attempt to satisfy the performance goals of the flows.

A fair-queuing scheduler 11, which is interposed in the path between the computing service 15 and its clients is utilized. The scheduler 11 intercepts the requests sent to the computing service 15, and scheduler 11 limits the resource consumption of each flow in proportion to a corresponding weight (or "share") φ assigned to that flow. As discussed further herein, controller 10 enforces performance differentiation by dynamically setting each individual flow's weight appropriately given performance (e.g., latency and throughput) measurements 102.

Figure 2:
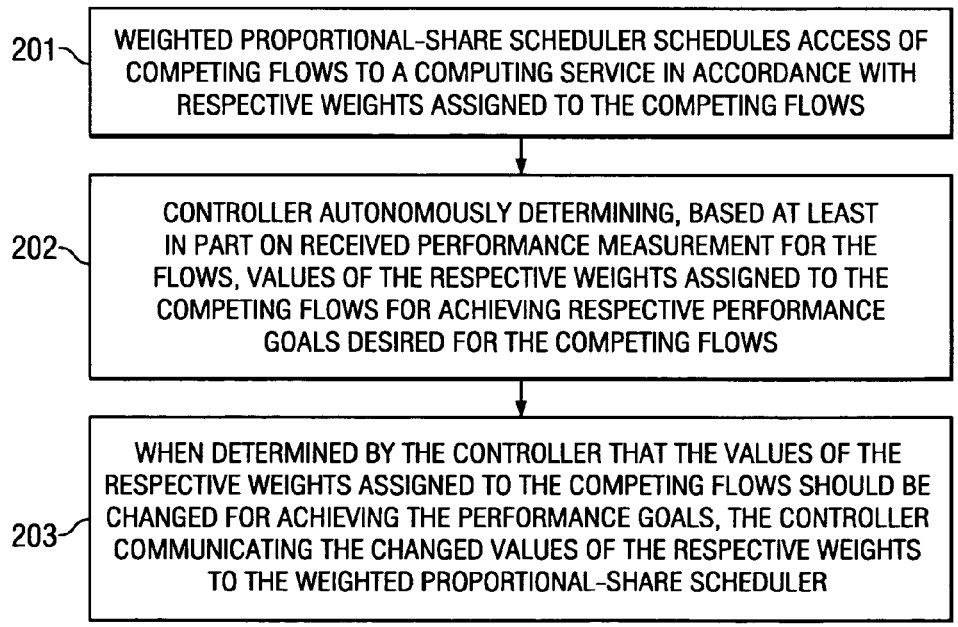
FIG. 2 shows an exemplary operational flow of a system, such as system 100 of FIG. 1, according to one embodiment of the present invention.

FIG. 2 shows an exemplary operational flow of a system, such as system 100 of FIG. 1, according to one embodiment of the present invention. In operational block 201, a weighted proportional-share scheduler 11 schedules access of competing flows 1-N to a computing service 15 in accordance with respective weights φ assigned to the competing flows. In operational block 202, a controller 10 autonomously determines (e.g., by performance differentiation algorithm 101), based at least in part on received performance measurement 102 for the flows, values of the respective weights φ assigned to the competing flows for achieving respective performance goals 103 desired for the competing flows. In operational block 203, when determined by the controller 10 that the values of the respective weights φ assigned to the competing flows 1-N should be changed for achieving the performance goals 103, the controller communicates the changed values of the respective weights φ to the weighted proportional-share scheduler 11. Exemplary techniques that are employed in certain embodiments by controller 10 for dynamically determining the proper weight assignments for the competing flows 1-N are discussed in greater detail below.

To derive a model of throughput and response time as a function of the weight assignment, assume for convenience that the weights of a computing service's workloads sum up to 1. That is, if a workload has a weight of 0.3, it is entitled to 30% of the computing service's capacity to serve requests. If the computing service 15 is fully utilized, the workload never receives anything above the share (or "weight") it is allocated. Thus, the scheduler 11 enforces performance isolation among workloads (such as between flows 1-N of FIG. 1).

Figure 3:
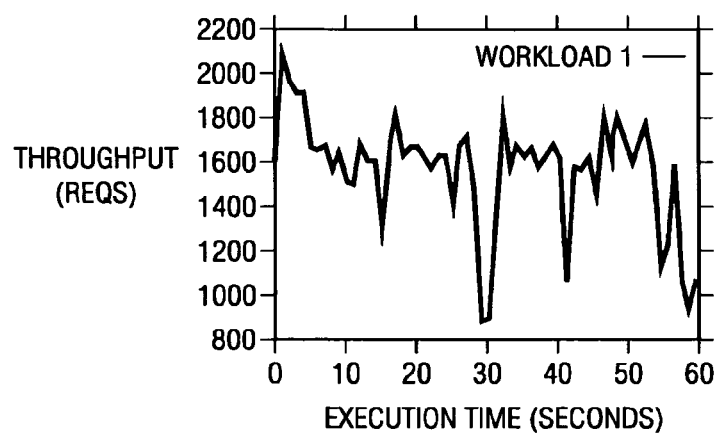
FIG. 3 shows a graph illustrating time-varying throughput of one workload with a fixed weight, in an exemplary NFS file server.

In the case of throughput goals, the weight is directly related to the portion of the computing service's total throughput a workload receives. Given that the total computing service throughput is sufficiently large to avoid quantization effects (i.e., the sample period is adequately long), this relation can be assumed to be linear. However, the total throughput of a computing service may vary over time, as shown in FIG. 3. That is, FIG. 3 shows a graph illustrating time-varying throughput of one workload with a fixed weight, in an exemplary NFS file server. This time-varying throughput may be due to a number of reasons, including other traffic on the network, in-memory caching effects, or background tasks (e.g., backup scripts) executing in the computing service.

In the case of latency goals, queuing theory implies that the relation between the weight and latency is nonlinear. For a high weight, there is little difference in latency when the weight is adjusted. But an adjustment when the weight is small makes a large difference in the response time. Locally, though, a linear approximation of this relation is adequate. For the same reasons that throughput varies given a fixed share setting, latency also varies. To approximate these system characteristics with a linear model, adaptive control is used.

Given the assumptions above, performance differentiation in a computing service 15 can be formulated as a linear quadratic optimization problem. Let $u(k)=[u_1(k) \ldots u_N(k)]^T$ be the vector of the weights for the N workloads of the computing service during sampling interval k. Let $y(k)=[y_1(k) \ldots y_N(k)]^T$ be the vector of the performance metrics (either latency or throughput in this example) of the N workloads (e.g., the N flows of FIG. 1), measured at the beginning of interval k. Performance differentiation can then be accomplished by minimizing the quadratic cost function $\|W(y_{ref}(k)-y(k))\|^2$ subject to the constraint that the weights sum up to one, i.e., $\Sigma_{i=1}^{N} u_i(k)=1$. Here, the vector $y_{ref}(k)=[y_{ref,1}(k) \ldots y_{ref,N}(k)]^T$ captures the desired performance goals 103 of the N workloads and $\|\cdot\|$ is the 2-norm in $\Re^N$. The cost is zero when all workloads achieve the desired performance goals 103. In this way, adaptive controller 10 can achieve independent performance goals 103 for each workload.

The weighting matrix W in the cost function, commonly chosen as a diagonal matrix, provides a means of prioritization among workloads. When the capacity of the system is not adequate to satisfy all workloads, the cost function is minimized when all workloads receive an equal amount of performance degradation if W=I. If, instead, W≠I, e.g., $W_{11}>W_{22}$, then workload $W_{11}$ has priority over workload $W_{22}$ in terms of meeting their individual performance goals. Under overload conditions, the cost function is minimized by degrading more of the performance of workload $W_{22}$ than that of workload $W_{11}$.

Consider, for example, a computing service 15, which is shared by N concurrent workloads, such as system 100 of FIG. 1. Further, assume that the mapping from the N workload shares (u(k)) to the N measured performance metrics (y(k)), such as response times or throughputs, can be described by the following multiple-input-multiple-output (MIMO) model:

$$A(q^{-1})y(k)=B(q^{-1})u(k)+e(k) \qquad (1)$$

where $A(q^{-1})$ and $B(q^{-1})$ are matrix polynomials in the backward-shift operator:

$$A(q^{-1})=I-A_1q^{-1}-\ldots -A_nq^{-n}$$

$$B(q^{-1})=B_0q^{-1}+\ldots +B_{n-1}q^{-n} \qquad (2)$$

Note that $A_i \in \Re^{N \times N}$, $B_j \in \Re^{N \times N}$, $0<i \leq n$, $0 \leq j<n$, where n is the order of the system. $\{e(k)\}$ is a sequence of independent, identically distributed N-dimensional random vectors with zero means. It is further assumed that e(k) is independent of y(k−j) and u(k−j) for j>0. We use e(k) in this example to represent disturbances in the system that are not accounted for by the model. The linear model is chosen here for tractability, as the real system dynamics will indeed, in all but the most trivial cases, be nonlinear.

The reason for choosing a MIMO model over a number of independent SISO (single-input-single-output) models is that it allows correlations between various shares and performance measurements to be captured. For example, increasing the share of one workload may decrease the performance of another if they use the same resource within the service. Such dependencies are not captured by individual SISO models. Moreover, a MIMO controller facilitates providing flexible policies when the system does not have enough capacity to meet all individual goals. For example, ensuring that all workloads receive the same performance degradation would be difficult to enforce using independent SISO controllers due to coordinating among the independent SISO controllers. Accordingly, in certain embodiments, controller 10 of FIG. 1 is a MIMO controller.

Some form of system identification is used to estimate the order of the system (n) as well as the parameter matrices $A_i$ and $B_j$, with $0<i \leq n$ and $0 \leq j<n$. The estimated parameters are then used in the controller design. (n) is usually fixed and low in computer systems, and thus can be estimated offline. However, the values of the parameter matrices are likely to vary in a typical computing service 15 due to changes in system operating conditions and workload dynamics. For example, a workload may shift from accessing data from the disk to accessing data from the in-memory cache of a server. Such a change would result in more than an order of magnitude better performance, and thus would require different model parameters. Therefore, certain embodiments utilize an adaptive controller 10 where model parameters are estimated on-line and controller parameters are calculated accordingly.

For notational convenience, we rewrite the system model in the following form, which is used hereafter:

$$y(k+1)=X(k)\phi(k)+e(k+1) \quad (3)$$

where $$X(k)=[B_0 \ldots B_{n-1}A_1 \ldots A_n]$$

$$\phi(k)=[u^T(k) \ldots u^T(k-n+1)y^T(k) \ldots y^T(k-n+1)]^T$$

Adaptive controller 10 may be implemented to automatically tune itself while the system is running. Accordingly, controller 10 may be implemented as a Self-tuning regulator (STR). STRs are one of the most commonly used and well-studied adaptive controllers. STRs have two parts: an estimator and a control law, which are usually invoked at every sample period. The most commonly used estimator in STRs is recursive least-squares (RLS). The purpose of this estimator is to dynamically estimate a model of the system relating the measured metrics with the actuation. The control law will then, based on this model, set the actuators in attempt to achieve the desired performance. The ability of the controller to achieve the performance goals is explicitly tied to how well the model represents the system at that instant.

Figure 4:
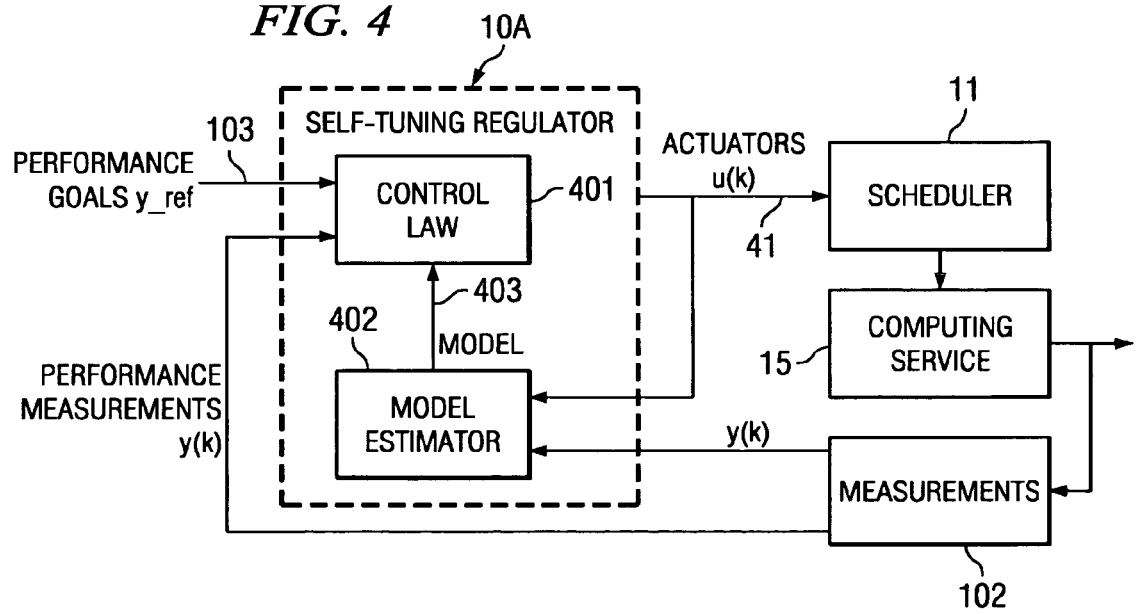
FIG. 4 shows an exemplary embodiment of the present invention in which an adaptive controller is implemented as a self-tuning regulator (STR).

FIG. 4 shows an exemplary embodiment in which the adaptive controller 10 is implemented as a STR. In FIG. 4, STR 10A comprises two parts: an estimator 402 and a control law 401. Typically, estimator 402 and control law 401 are invoked at every sample period. Estimator 402 dynamically estimates a model 403 of the computing system 15 relating the measured metrics 102 with the actuation 41 (e.g., change in weight assignments $\phi$). In some cases, the actuation value might actually be the same as it was before the receipt of the measured metrics 102. Control law 401 will then, based on this model 403, set the actuators in attempt to achieve the desired performance 103. The ability of the STR 10A to achieve the performance goals 103 is explicitly tied to how well the model 403 represents the system 12 at that instant. As discussed further below, control law 401 is implemented to provide performance differentiation algorithm 101 of FIG. 1 based on the dynamically estimated model 403. while the exemplary embodiment of FIG. 4 implements both a model estimator 402 and a control law 401, in certain embodiments (particularly for a very stable system) controller 10A may be implemented with a static model. The control law 401 described further herein may be run on that model all the time.

The most commonly used estimator 402 in STRs is recursive least-squares (RLS). An RLS estimator with exponential forgetting is used in certain embodiments to estimate the time varying parameter matrix X(k). This type of estimator has been used extensively in adaptive control systems as it converges fast and rejects noise well. The estimator 402 is defined by the following equations:

$$\hat{X}(K+1) = \hat{X}(k) + \frac{\varepsilon(k+1)\phi^T(k)P(k-1)}{\lambda + \phi^T(k)P(k-1)\phi(k)} \quad (4)$$

$$\varepsilon(k+1) = y(k+1) - \hat{X}(k)\phi(k)$$

$$P^{-1}(k) =$$

$$P^{-1}(k-1) + \left(1 + (\lambda-1)\frac{\phi^T(k)P(k-1)\phi(k)}{(\phi^T(k)\phi(k))^2}\right)\phi(k)\phi^T(k)$$

where $\hat{X}(k)$ is the estimate of the true value of X(k), $\in(k)$ is the estimation error vector, P(k) is the covariance matrix and $\lambda$ is the forgetting factor (0<$\lambda \leq$1). Directional forgetting, such as described in R. Kulhavý, "Restricted exponential forgetting in real-time identification, *Automatica*, volume 23, pages 589-600, September 1987, the disclosure of which is hereby incorporated herein by reference, is used in this exemplary embodiment to avoid wind-up of the covariance matrix.

In certain embodiments, the controller 10's design (e.g., controller 10A of FIG. 4) aims at minimizing the following quadratic cost function:

$$J = E\{\|W(y(k+1) - y_{ref}(k+1))\|^2 + \|Qu(k)\|^2\} \quad (5)$$

$$s.t. \sum_{i=1}^{N} u_i(k) = 1 \quad (6)$$

where $W \in \mathfrak{R}^{N \times N}$ is a positive-semidefinite weighting matrix on the tracking errors and $Q \in \mathfrak{R}^{N \times N}$ is a positive-definite weighting matrix on the control settings.

The goal of the controller 10, in one embodiment, is to steer the system into a state of optimum reference tracking with minimum variance, while penalizing large control settings. The W and Q weighting matrices are commonly chosen as diagonal matrices. Their relative magnitude provides a way to trade-off tracking accuracy for stability. Also, in the case of W, the values of the diagonal terms capture the relative priorities of the corresponding workloads, when the computing service 15 is overloaded.

The minimization should be over the set of all admissible controllers, where a controller is admissible if each control action u(k) is a function of vector $\phi$(k-1) and of the new measurements y(k). In the following, an optimal controller 10A, according to one embodiment of the present invention, is derived by explicitly capturing the dependency of the cost function J on u(k). In this exemplary embodiment, we first define $$\tilde{\phi}(k)=[0u^T(k-1) \ldots u^T(k-n+1)y^T(k) \ldots y^T(k-n+1)] \quad (7)$$

Then we have, $$J = E\{\|W(y(k+1) - y_{ref}(k+1))\|^2 + \|Qu(k)\|^2\}$$

$$= E\{\|W(\hat{X}(k)\tilde{\phi}(k) + B_0u(k) + \varepsilon(k+1) - y_{ref}(k+1))\|^2\} + \|Qu(k)\|^2$$

$$= \|W(\hat{X}(k)\tilde{\phi}(k) - y_{ref}(k+1))\|^2 + \|W\hat{B}_0u(k)\|^2 +$$

$$2u^T(k)\hat{B}_0^T W^T W(\hat{X}(k)\tilde{\phi}(k) - y_{ref}(k+1)) + \|Qu(k)\|^2 +$$

$$E\{\|W\varepsilon(k+1)\|^2\}$$

Without the normalization constraint (6), the cost function J is at its minimum where the following derivative is zero.

$$\frac{\partial J}{\partial u(k)} = 2(W\hat{B}_0)^T W(\hat{X}(k)\tilde{\phi}(k)) \quad (8)$$

$$= y_{ref}(k+1)) + 2(W\hat{B}_0)^T W\hat{B}_0u(k) + 2Q^T Qu(k)$$

$$= 0$$

Solving for u(k) provides the following unconstrained optimal control law:

$$u_{uc}^*(k)=((W\hat{B}_0)^T W\hat{B}_0+Q^T Q)^{-1}$$

$$(W\hat{B}_0)^T W(y_{ref}(k+1)-\hat{X}(k)\tilde{\phi}(k)) \quad (9)$$

Note that $\hat{X}(k)$ and $\hat{B}_0$ are estimates of the model parameters obtained using the RLS estimator ((4)). The resulting controller 10A is referred to as the linear quadratic self-tuning regulator.

Now, let us take the normalization constraint (6) into account using a Lagrangian multiplier, $\lambda_L$. Let $$L(u(k)\lambda_L) = J + \lambda_L\left(\sum_{i=1}^{N} u_i(k) - 1\right) \quad (10)$$

The derivative equation can be updated as follows:

$$\frac{\partial L(u(k), \lambda_L)}{\partial u(k)} = \frac{\partial J}{\partial u(k)} + \lambda_L I_N = 0 \quad (11)$$

where $I_N = [1 \ldots 1]^T \in \mathfrak{R}^N$ is a constant vector. Again, solving for u(k) provides the following adjusted control law 401:

$$u^*(k) = u_{uc}^*(k) - \frac{\lambda_L}{2} S I_N \quad (12)$$

where $S = ((W\hat{B}_0)^T W\hat{B}_0 + Q^T Q)^{-1}$ can be viewed as a scaling matrix. $\lambda_L$ can be calculated by substituting the above u(k) into equation (6). Then we have, $$\lambda_L = \frac{2(I_N^T u_{uc}^*(k) - 1)}{I_N^T S I_N} \quad (13)$$

Therefore, the constrained optimal control law 401 is $$u^*(k) = u_{uc}^*(k) - \frac{I_N^T u_{uc}^*(k) - 1}{I_N^T S I_N} S I_N \quad (14)$$

So, in one embodiment the constrained optimal control law 401 provides performance differentiation algorithm 101 of FIG. 1. Exemplary pseudo-code for implementing such optimal control law 401 is provided below.

As we can see, $\lambda_L = 0$ when $I_N^T u_{uc}^*(k) - 1 = 0$, i.e., the unconstrained optimal control law already obeys the normalization constraint. Otherwise, individual shares are adjusted according to the scaling matrix S so that the sum equals 1.

Exemplary pseudo-code for the algorithm (e.g., performance differentiation algorithm 101 of FIG. 1) that implements the above control law 401 according to one embodiment is as follows:

1 k=0, choose $\hat{X}(0)$ and P(0);
2 k=k+1 at the beginning of every sampling interval;
3 Obtain new measurements y(k);
4 if total throughput for all the workloads <5, then perform step 9, otherwise step 6;
5 u(k)=u(-1); go to step 2;
6 estimate new model parameters $\hat{X}(k)$ using RLS (4);
7 calculate u(k) according to the optimal control law (14);
8 if $\min_{i\{u_i\}}(k)<0 \forall i$, then continue with step 9, otherwise advance to step 11;
9 $u_i(k)=u_i(k)-\min_i\{u_i(k)\} \forall i$;
10 normalize the $u_i(k)$'s s.t. they add up to 1;
11 go back to step 2;

In certain embodiments, we determine the order and time delay of the system in online system identification experiments. These experiments also help us choose initial values for $\hat{X}(0)$ and P(0). The above algorithm also handles special cases such as when there are not enough samples or when at least one control setting is negative. Exemplary techniques for addressing negative control settings that may be used in certain embodiments of the present invention are discussed further in co-pending and commonly assigned U.S. patent application Ser. No. 11/149,991 titled "SYSTEM AND METHOD FOR DETERMINING CORRECT SIGN OF RESPONSE OF AN ADAPTIVE CONTROLLER", the disclosure of which is hereby incorporated herein by reference.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. Thus, the exemplary operations described above (e.g., performance differentiation algorithm 101 of FIG. 1, control law 401 of FIG. 4, equation 14, etc.) may be implemented in a system via computer-executable software code. The software code may run on any suitable processor-based system, such as the exemplary adaptive controller 10 of FIG. 1 or controller 10A of FIG. 4.

In view of the above, in one embodiment, an adaptive controller is implemented as an STR 10A having an estimator 402 and a control law 401. The estimator 402 estimates a model 403 of the system online, which is fed to control law 401, and the control law 401 will, given this model 403, determine the proper weights to be assigned to the competing workloads for use by weighted proportional-share scheduler 11.

In certain embodiments, model 403 is a multiple input/multiple output (MIMO) model, which enables the controller to adapt weight settings for a plurality of different metrics. Also, such MIMO model is useful when there exists more than one workload, which is the common case. One performance metric of one workload is one single input. The desired resource consumption of one particular resource by one workload is one single output. For example, suppose there are two workloads, each having respective latencies and respective weights. MIMO model 403 will tell how much each single one of these workload latencies will change as a function of both of the weight settings assigned to the workloads.

Model 403 is passed to the control law 401, and in certain embodiments the control law 401 has a "goal function." This goal function comprises two parts. The first part specifies how much effort the controller should expend in meeting the performance goals 103 predefined for the competing workloads. And, the second part specifies how much the controller is allowed to change the weights assigned to the workloads. This prevents the controller from oscillating between extreme weight assignments. This limit is referred to as the vibration number. Thus, it is desirable to meet the performance goals 103, but also without setting excessive volumes in the control parameters (weight assignments) so as to avoid too much fluctuation. So, in certain embodiments there is a "penalty" for offsetting to extreme volumes. One way of taking into account a penalty is to use (phi(k)-phi (k−1), which directly represents penalizing large changes. The reason small changes are generally desirable is to limit oscillations.

The control law 401 receives the current estimated model 403 of the system, an objective function (e.g., equation No. (5), which specifies the trade-off between meeting the goals and large actuation changes as discussed above), and any constraints; and on the basis of these determines the proper parameter settings (i.e., proper weights to be assigned to the competing workloads). These determined weight values are then communicated to the scheduler 11, and the process is then repeated the next sample period.

What is claimed is:

1. A method comprising:
scheduling, by a weighted proportional-share scheduler, access of competing flows to a computing service in accordance with respective weights assigned to the competing flows;
autonomously determining, by a controller, based at least in part on received performance measurement for the flows, values of said respective weights assigned to the competing flows for achieving respective performance goals desired for the competing flows, wherein the controller does not have a priori knowledge of capacity of said computing service; and
when determined by said controller that the values of said respective weights assigned to the competing flows should be changed for achieving said performance goals, communicating from said controller said changed values of said respective weights to said weighted proportional-share scheduler.

2. The method of claim 1 wherein said weighted proportional-share scheduler is a Weighted Fair Queuing (WFQ) scheduler.

3. The method of claim 1 further comprising:
receiving by said controller input defining said performance goals desired for the competing flows.

4. The method of claim 3 wherein said performance goals are defined in terms of at least one of latency and throughput.

5. The method of claim 1 wherein said controller comprises a self-tuning regulator (STR) having a model estimator and a control law.

6. The method of claim 5 wherein said model estimator dynamically estimates a model of the computing service relating the received performance measurement with the respective weights assigned to the competing flows.

7. The method of claim 6 wherein said control law autonomously sets the respective weights assigned to the competing flows based on the model estimated by the model estimator in attempt to achieve said performance goals.

8. A method comprising:
scheduling, by a weighted proportional-share scheduler, access of competing flows to a computing service in accordance with respective weights assigned to the competing flows;
autonomously determining, by a controller, based at least in pad on received performance measurement for the flows, values of said respective weights assigned to the competing flows for achieving respective performance goals desired for the competing flows;
when determined by said controller that the values of said respective weights assigned to the competing flows should be changed for achieving said performance goals, communicating from said controller said changed values of said respective weights to said weighted proportional-share scheduler; and
wherein said controller comprises a self-tuning regulator (STR) having a model estimator and a control law, and wherein said control law comprises:
a constrained optimal control law according to $$u^*(k) = u_{uc}^*(k) - \frac{I_N^T u_{uc}^*(k) - 1}{I_N^T S I_N} S I_N,$$

wherein $u_{uc}^*(k)$ represents an unconstrained control output, I is a constant sector having N ones, T is a transpose matrix operator, and S represents a scaling factor.

9. The method of claim 8 wherein said control law operates as follows:
1) k=0, choose $\hat{X}(0)$ and P(0);
2) k=k+1 at the beginning of every sampling interval;
3) obtain new measurements y(k);
4) if total throughput for all the workloads <5, then perform step 5, otherwise advance to step 6;
5) u(k)=u(−1); go to step 2;
6) estimate next model parameters $\hat{X}(k)$;
7) calculate u(k) according to the constrained optimal control law;
8) if $\min_i\{u_i(k)\}<0 \forall i$, then continue with step 9, otherwise advance to step 11;
9) $u_i(k)=u_i(k)-\min_i\{u_i(k)\} \forall i$;
10) normalize the $u_i(k)$'s so they sum to 1; and
11) go back to step 2.

10. A system comprising:
a weighted proportional-share scheduler operable to schedule access of competing flows to a computing service in accordance with respective weights assigned to the competing flows;
a controller operable to autonomously determine, based at least in part on received performance measurement for the flows, values of said respective weights assigned to the competing flows for achieving respective performance goals desired for the competing flows; and
said controller communicatively coupled to said weighted proportional-share scheduler so that when determined by said controller that the values of said respective weights assigned to the competing flow s should be changed for achieving said performance goals, said controller is further operable to communicate said changed values of said respective weights to said weighted proportional-share scheduler;
wherein said controller comprises a self-tuning regulator (STR) having a model estimator and a control law, wherein said control law comprises:
a constrained optimal control law according to $$u^*(k) = u_{uc}^*(k) - \frac{I_N^T u_{uc}^*(k) - 1}{I_N^T S I_N} S I_N,$$

wherein $u_{uc}^*(k)$ represents an unconstrained control output, I is a constant vector having N ones, T is a transpose matrix operator, and S represents a scaling factor.

11. The system of claim 10 wherein said weighted proportional-share scheduler is a Weighted Fair Queuing (WFQ) scheduler.

12. The system of claim 10 wherein said controller is further operable to receive input defining said performance goals desired for the competing flows.

13. The system of claim 12 wherein said performance goals are defined in terms of at least one of latency and throughput.

14. The system of claim 10 wherein said model estimator is operable to dynamically estimate a model of the computing service relating the received performance measurement with the respective weights assigned to the competing flows.

15. The system of claim 14 wherein said control law is operable to autonomously set the respective weights assigned to the competing flows based on the model estimated by the model estimator in attempt to achieve said performance goals.

16. A controller for autonomously adjusting weights assigned to competing consumers of a computing service, said controller comprising:
   a model estimator operable to receive performance measurement of the competing consumers and dynamically estimate a model of the computing service, wherein the model relates the received performance measurement with respective weights assigned to the competing consumers; and
   a control law operable to autonomously set the respective weights assigned to the competing flows based on the model estimated by the model estimator in attempt to achieve said performance goals: wherein said control law comprises a constrained optimal control law according to $$u^*(k) = u_{uc}^*(k) - \frac{I_N^T u_{uc}^*(k) - 1}{I_N^T S I_N} S I_N,$$

wherein $u_{uc}^*(k)$ represents an unconstrained control output, I is a constant vector having N ones, T is a transpose matrix operator, and S represents a scaling factor.

17. The controller of claim 16 communicatively coupled to a weighted proportional-share scheduler for communicating said respective weights to said weighted proportional-share scheduler.

* * * * *

UNITED STATES PATENT AND TRADEMARK OFFICE
CERTIFICATE OF CORRECTION

PATENT NO. : 7,362,766 B2  
APPLICATION NO. : 11/166326  
DATED : April 22, 2008  
INVENTOR(S) : Magnus Karlsson et al.

It is certified that error appears in the above-identified patent and that said Letters Patent is hereby corrected as shown below:

In column 10, line 37, delete "$\bar{\phi}(k)=[0u^T(k-1)\ldots u^T(k-n+1)y^T(k)\ldots y^T(k-n+1)]$"

and insert -- $\tilde{\phi}(k)=[0u^T(k-1)\ldots u^T(k-n+1)y^T(k)\ldots y^T(k-n+1)]^T$ --, therefor.

In column 13, line 60, in Claim 8, delete "pad" and insert -- part --, therefor.

In column 14, line 14, in Claim 8, delete "sector" and insert -- vector --, therefor.

In column 14, line 24, in Claim 9, delete "next" and insert -- new --, therefor.

In column 14, line 47, in Claim 10, delete "flow s" and insert -- flows --, therefor.

In column 16, line 4, in Claim 16, delete "goals:" and insert -- goals; --, therefor.

Signed and Sealed this

Fifth Day of May, 2009

JOHN DOLL  
*Acting Director of the United States Patent and Trademark Office*